US007826399B2

(12) United States Patent
Heil et al.

(10) Patent No.: US 7,826,399 B2
(45) Date of Patent: *Nov. 2, 2010

(54) STRUCTURE FOR PREVENTING STARVATION IN A SLOTTED RING DATA COMMUNICATIONS NETWORK

(75) Inventors: Timothy Hume Heil, Rochester, MN (US); Michael Steven Siegel, Raleigh, NC (US); Jeffrey R. Summers, Raleigh, NC (US); Steven Paul VanderWiel, Rosemount, MN (US)

(73) Assignee: International Business Machines Corporation, Armonk, NY (US)

( * ) Notice: Subject to any disclaimer, the term of this patent is extended or adjusted under 35 U.S.C. 154(b) by 309 days.

This patent is subject to a terminal disclaimer.

(21) Appl. No.: 12/042,612

(22) Filed: Mar. 5, 2008

(65) Prior Publication Data

US 2008/0159176 A1   Jul. 3, 2008

Related U.S. Application Data

(63) Continuation-in-part of application No. 11/426,746, filed on Jun. 27, 2006.

(51) Int. Cl.
*H04L 12/43* (2006.01)
(52) U.S. Cl. .................. 370/258; 370/403; 370/460
(58) Field of Classification Search .................. None
See application file for complete search history.

(56) References Cited

U.S. PATENT DOCUMENTS

| 2003/0212812 | A1  | 11/2003 | Wang et al. ............ 709/234 |
| 2006/0045120 | A1* | 3/2006  | Mattina et al. .......... 370/460 |
| 2008/0159176 | A1* | 7/2008  | Heil et al. ............. 370/258 |

OTHER PUBLICATIONS

Cidon et al., "Improved Fairness Algorithms for Rings with Spatial Reuse," IEEE/ACM Transactions on Networking (1999).
Kamat et al., "Real-Time Schedulability of Two Token Ring Protocols," International Conference on Distributed Computing Systems (1993).
Zhang et al., "Cycle-Time Properties of the Timed Token Medium Access Control Protocol," (1999).

* cited by examiner

*Primary Examiner*—Chi H. Pham
*Assistant Examiner*—Shick Hom
(74) *Attorney, Agent, or Firm*—Roy W. Truelson

(57) ABSTRACT

A design structure is provided for a slotted ring network, in which a node may transmit a non-renewable slot reservation with any unreserved slot. The reservation restricts other nodes from transmitting a new packet in the slot. When the slot returns around the ring to the reserving node, the slot will be available. Preferably, reservation is made responsive to a starvation condition in the reserving node, which may be detected in any of various ways. In an optional enhancement, a reservation identifies the reserving node, and another node on the ring is free to transmit a new packet in the reserved slot if the new packet will reach its destination at or before the reserving node, and thus will not interfere with the reservation.

17 Claims, 6 Drawing Sheets

STRUCTURE FOR PREVENTING STARVATION IN A SLOTTED RING DATA COMMUNICATIONS NETWORK

CROSS REFERENCE TO RELATED APPLICATION

This is a continuation-in-part of U.S. patent application Ser. No. 11/426,746, filed Jun. 27, 2006, entitled "Method and Apparatus for Preventing Starvation in a Slotted Rign Data Communications Network", which is herein incorporated by reference. This application claims priority under 35 U.S.C. §120 of U.S. patent application Ser. No. 11/426,746, filed Jun. 27, 2006.

FIELD OF THE INVENTION

The present invention relates to digital data processing, and in particular to design structures for slotted ring data networks for transferring data between different digital data processing systems or different components of a digital data processing system.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system is an enormously complex machine, usually having many sub-parts or subsystems, each of which may be concurrently performing different functions in a cooperative, although partially autonomous, manner. Typically, the system comprises one or more central processing units (CPUs) which form the heart of the system, and which execute instructions contained in computer programs. Instructions and other data required by the programs executed by the CPUs are stored in memory, which often contains many heterogenous components and is hierarchical in design, containing a base memory or main memory and various caches at one or more levels. At another level, data is also stored in mass storage devices such as rotating disk drives, tape drives, and the like, from which it may be retrieved and loaded into memory. The system also includes hardware necessary to communicate with the outside world, such as input/output controllers; I/O devices attached thereto such as keyboards, monitors, printers, and so forth; and external communication devices for communicating with other digital systems.

Each component of a digital computer system is itself a very complex instrument, having a design hierarchy which can mimic that of the system. For example, a disk drive storage device typically contains one or more spinning disks on which data is recorded, an actuator and transducers for accessing data on the disk, a central controller which executes a control program for controlling the operation of the device, motors for driving the spinning disk and the mechanical actuator, various drivers for the motor, actuator and transducer, sense amplification electronics for reading the transducer, internal communications interfaces among the various components, and an external communications interface for communicating data with the outside world. Within any such component, further design hierarchies may exist.

Although a general-purpose computer can be programmed to perform a variety of different tasks, the range of applications and environments in which computer systems and other digital devices will be used creates a demand for devices of differing sizes and configurations. Some computer systems are used primarily as servers, in which multiple users (who may be geographically isolated, using a heterogeneous mixture of computer systems and application software) access a centralized set of applications and common database. Other computer systems are used primarily as single-user devices, in which a single user performs a set of applications of interest to the user, locally stores data of interest to the user, and may optionally communicate with other computers as required to access external data. Still other computer systems may perform specialized functions, such as monitoring and controlling physical sensors, switches, motors, valves, and other controls. A special-purpose digital device may or may not even be considered a computer system, but contains many of the design attributes of a general-purpose computer system.

With all the design hierarchies that exist in digital data systems, there is a general need to communicate data among different digital systems or components thereof. Data communication occurs among different digital computer systems, as in the Internet or in a local area network; or among different components of a single digital computer system; or even within the functional elements of a single integrated circuit chip, which is itself part of a larger computer system.

One known technique for supporting data communication among more that two devices is a slotted ring network. A slotted ring network is a packet-based communications network containing a set of point-to-point communication links, each running between of pair of systems, devices, or functional components or subcomponents thereof (herein generally referred to as nodes of the network), the links being arranged to form a ring which includes all the nodes of the network. A node A, wishing to transmit a packet to a node B, transmits the packet to A's immediate neighbor on the ring, which then forwards the packet along the ring, until the packet reaches node B. The network is generally time-multiplexed, so that each packet is transmitted to a next node on the ring during a time interval, and is re-transmitted along the ring in successive time intervals. The capacity of the ring to carry a data packet in such a time interval is referred to as a slot. The ring has a fixed number of slots, each slot traveling around the ring on a pre-determined, fixed schedule. The number of slots may be equal to the number of devices on the ring, or there may be either a greater number or lesser number of slots; e.g., a greater number of slots may be present if the slots delay one or more intervals in some or all of the nodes. A slot may or may not contain a data packet, but travels on the same pre-determined schedule in any case. Arbitration and contention avoidance is relatively simple: if a node wishes to transmit, it waits for a free slot (i.e., one in which there is no packet that needs to be forwarded along the ring from another device), and transmits its packet in the free slot.

Slotted ring networks have the advantage of simple implementation and high utilization without contention. However, one recurring problem with slotted ring networks is starvation. Starvation may occur when a node A transmits a large volume of data to a node B, effectively preventing a node C located between A and B on the network path from transmitting. Starvation in a slotted ring network has been known for some time, and various techniques have been proposed or implemented for dealing with the starvation issue. In general, these techniques involve added complexity and/or may decrease the utilization of the network bandwidth.

It would be desirable to provide improved communications techniques for communicating data among multiple digital devices or components thereof which retain or approach the simplicity and high utilization of a simple slotted ring yet avoid starvation.

SUMMARY OF THE INVENTION

A design structure is provided for a slotted ring network, in which a node may transmit a non-renewable slot reservation with any unreserved network slot. The reservation prevents other nodes from re-using the slot with a new data packet which would pre-empt the reserving node. When the slot returns around the ring to the node which originally reserved it, the slot is therefore guaranteed to be available.

In the preferred embodiment, a reservation is transmitted upon detection of a starvation state. Starvation can be detected in any of various ways. In a first implementation, starvation is detected when a node waiting to transmit has been unable to do so after a pre-determined number of cycles. In a second implementation, starvation is detected by monitoring network traffic over time at each network node, and assuming that a starvation state exists when the proportion of unavailable slots exceeds some threshold. Starvation could be detected using alternative techniques or combinations of techniques.

A reservation is non-renewable, meaning that a reserved slot can not be immediately reserved again by the same node which placed the original reservation. Non-renewability prevents a single node from perpetually reserving slots and starving other nodes, and guarantees that if multiple nodes are starved, the available reservations will eventually reach each node. In the preferred embodiment, a node may reserve successive slots subject to the limitation that it may not renew a reservation of the same slot. In an alternative embodiment, it would further be possible to place additional restrictions on the ability of any single node to reserve a sequence of slots, e.g., by allowing a node to reserve every other slot.

In the preferred embodiment, a reservation is a single bit of data which is carried with the slot and indicates that the slot has been reserved, although it does not identify the reserving node. The reserving node must identify a slot it reserves by counting cycles since making the reservation or other appropriate means. In an optional further embodiment, a reservation identifies the node which reserved the slot. In this optional embodiment, another node on the ring is free to transmit a new packet in the reserved slot, provided that the new packet will reach its destination at or before the reserving node, and thus will not interfere with the reserving node's ability to transmit a packet on the reserved slot.

In the preferred embodiment, the nodes are functional units within a single integrated circuit chip, the slotted ring network being used for communicating among the multiple functional units within the same integrated circuit chip. As such, each link of the slotted ring is physically implemented as a set of parallel signal wires, in which at least one wire is used for indicating a reservation of the corresponding slot. However, a slotted ring in accordance with the present invention could alternatively be used for communication among multiple integrated circuit chips or other components of a digital data processing system, or for communication among multiple digital data processing systems. Additionally, a slotted ring network in accordance with the present invention could alternatively be implemented as a set of serial data communication links, in which some bit or bits of a packet header or token are used to indicate reservation of the corresponding slot.

A simple reservation technique as described herein prevents starvation and assures fairness of access to network resources in a steady state when a slotted ring network is being heavily utilized. Furthermore, the technique described herein causes minimal reduction of network utilization, and can be achieved with only a small amount of additional hardware and/or software resource.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Network Environment

The present invention relates to the design of digital communications networks, and particularly slotted ring communications networks. In the preferred embodiment illustrated in FIG. 1, a slotted ring network is used to support communications among different components or functional units of an integrated circuit chip. However, this is but one of many possible implementations and digital data environments in which the present invention might be employed. The present invention may alternatively be employed to support communications among multiple different digital data processing systems, as illustrated in FIG. 2, or among multiple components of a single digital data processing system. In general, a digital data processing system, or component, subcomponent or functional unit thereof, which communicates with other systems, components, subcomponents or functional units using a slotted ring network, is referred to herein as a "node" on the slotted ring network. Although the network is described herein as an on-chip implementation in which the "nodes" are functional units of the same integrated chip, it will be understood that the term "node" encompasses any of the above-mentioned implementations of a slotted ring network.

Figure 1:
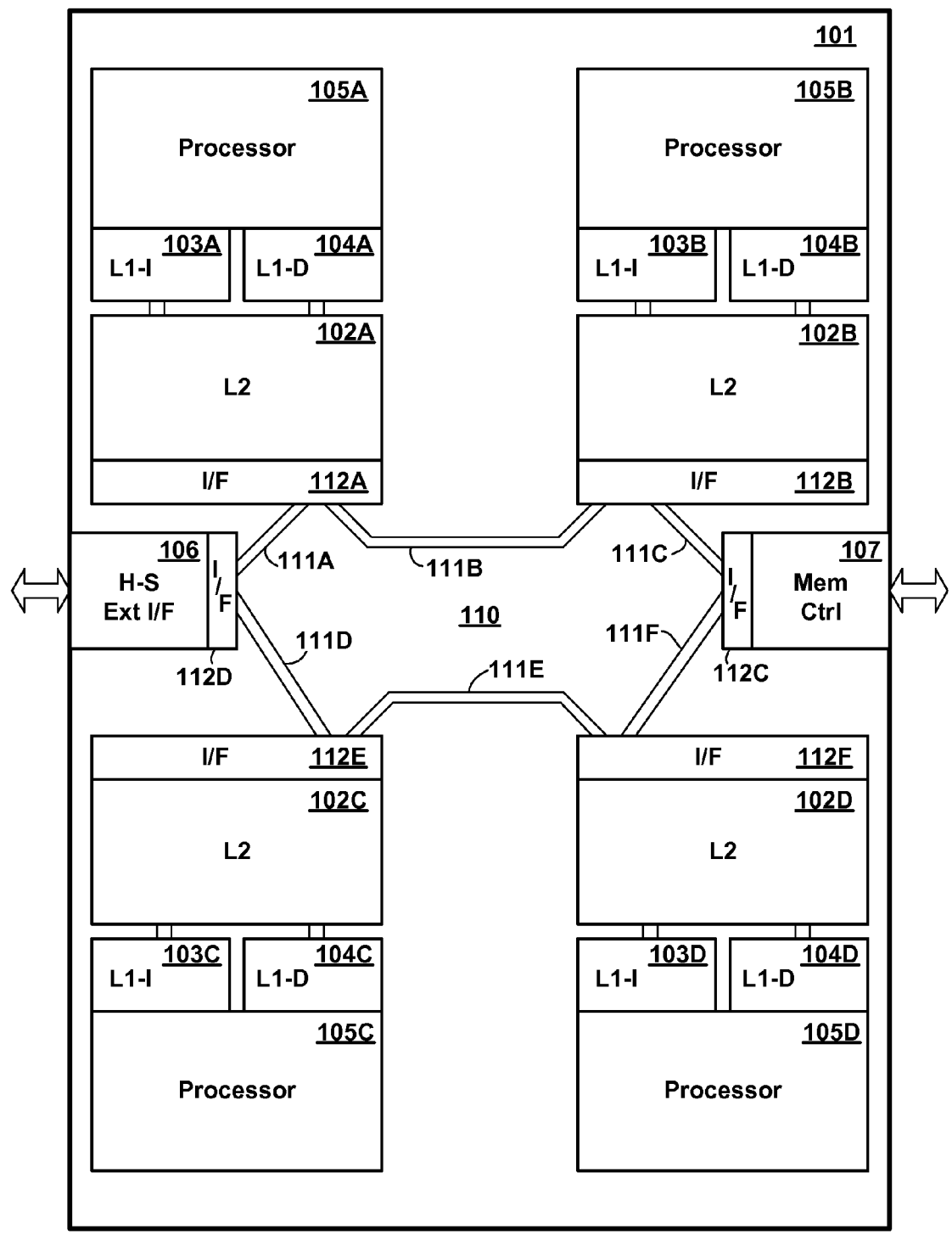
FIG. 1 is a high-level block diagram of an integrated circuit chip for embodying one or more aspects of the present invention, according to the preferred embodiments thereof.
Figure 2:
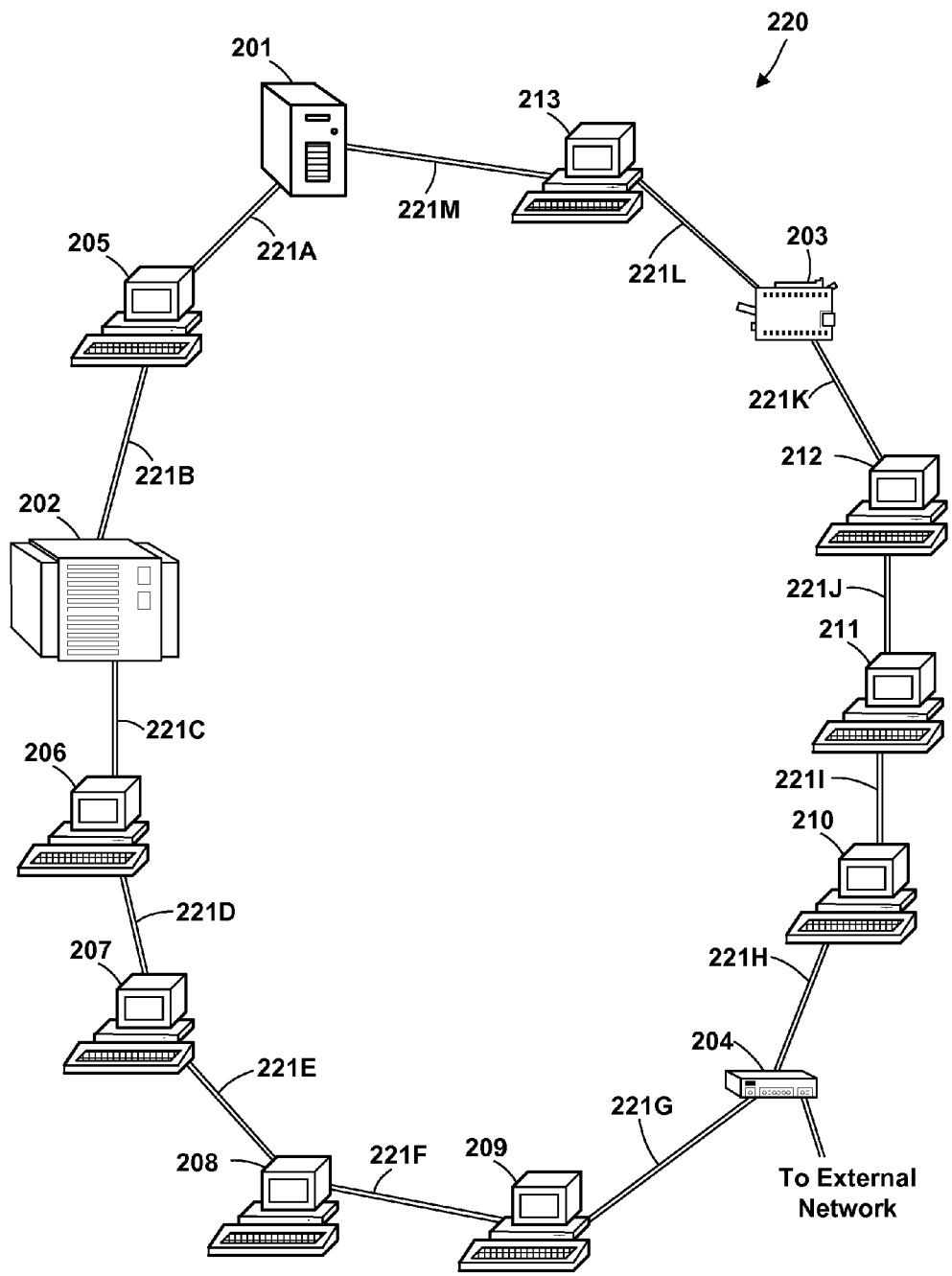
FIG. 2 is a high-level representation of collection of digital devices in communication with one another using a network embodying one or more aspects of the present invention, according to an alternative embodiment.

Referring to the Drawing, wherein like numbers denote like parts throughout the several views, FIG. 1 is a high level block diagram of an integrated circuit chip 101 containing a slotted ring network embodying one or more aspects of the present invention, according to the preferred embodiment. In the preferred embodiment, chip 101 is a processor chip for a general purpose multi-processor computer system, it being understood that this is but one example of an integrated circuit chip having a slotted ring network, and such a network could be implemented in chips having different function. Chip 101 comprises four independent processors or processor "cores" 105A-D (herein generically referred to as feature 105). Each processor 105 has associated with it a respective level 1 instruction cache (L1 I-cache) 103A-D (herein generically referred to as feature 103), level 1 data cache (L1 D-cache) 104A-D (herein generically referred to as feature 104), and level 2 cache (L2 cache) 102A-D (herein generically referred to as feature 102). Chip 101 further includes a high-speed external interface 106 for communicating with one or more similar processor chips and/or interfaces to I/O buses (not shown), and memory controller external interface 107, which is an external interface to a set of memory chips forming all or part of the main memory of a general purpose computer system. A general purpose computer system could contain a single processor chip 101, or could contain multiple such chips ganged together. Where multiple processor chips are ganged together, the memory controller 107 in each chip accesses a different respective portion of the system's main memory.

Each processor core 105 is an independent processing entity capable of maintaining state for and executing threads independently. For example, each processor contains its own instruction state register or instruction address register which records a current instruction or instructions being executed, instruction sequencing logic, instruction decode logic, arithmetic logic unit or units, data registers, and various other components required for maintaining thread state and executing one or more threads. In general, data required by a processor is loaded into the corresponding L2 cache 102 (and L1 I-cache 103 or L1 D-cache 104, as the case may be) from main memory through the local memory controller 107, or through a memory controller in a different chip and transferred to chip 101 through high-speed external interface 106.

Slotted ring network 110 communicates data internally within chip 101 among the various functional units, i.e. L2 caches 102, high-speed external interface 106, and memory controller 107. Slotted ring network 110 comprises a set of point-to-point interconnection paths or links 111A-111F (herein generically referred to as feature 111), arranged in a ring topology to connect each of the functional units 102, 106, 107. Each internal functional unit 102, 106, 107 contains respective ring network interface logic 112A-F (herein generically referred to as feature 112), which is coupled to the two links 111 of slotted ring network 110 to which the corresponding functional unit is connected. In the preferred embodiment, each link is implemented as a set of parallel signal wires, as would typically be the case in an on-chip network; while it is theoretically possible to implement a ring network as a set of serial communications links, such an implementation is more suited to communications between physically separated devices, as in a local area network. In the preferred embodiment, the number of slots is equal to the number of nodes, each slot of the slotted ring network advancing one node along the network in each successive clock cycle, the clock being a universal clock for chip 101. It would alternatively be possible to buffer the slots for one (or more) cycles in each node, so that two (or more) cycles are needed for each node traversed along the ring, increasing the number of slots accordingly. As used herein, a "packet" of the slotted ring network comprising parallel links is the data transmitted on the set of parallel wires in a single clock cycle. It will be understood that for a slotted ring network implemented as serial links, a "packet" is generally defined differently. In the preferred embodiment, each link 111 is unidirectional, data always flowing in the same direction around the ring. However, such a slotted ring network is easily extended to provide for bi-directional communication by using two slotted ring networks, one flowing in each direction. In addition, multiple slotted ring networks may be employed in the same direction, for instance to increase network bandwidth or handle different types of traffic FIG. 2 is a high-level representation of collection of digital devices in communication with one another using a slotted ring network embodying one or more aspects of the present invention, according to an alternative embodiment. In the alternative embodiment of FIG. 2, a slotted ring network 220 supports communications among a heterogeneous collection of digital data devices 201-213. Representative devices illustrated in FIG. 2 include server system 201, storage array subsystem 202, printer 203, router 204 coupled to an external network (not shown), and individual workstations 205-213. It will be understood that the set of heterogeneous devices 201-213 illustrated in FIG. 2 is intended as merely one simple example of types of digital devices which may be attached to a local area network, and that a local area network or other slotted ring network may contain other or additional devices than those represented in FIG. 2.

Slotted ring network 220 communicates data among the various heterogeneous devices 201-213 using point-to-point interconnection paths 221A-221M (herein generically referred to as feature 221), arranged in a ring topology to connect each of the devices 201-213. In a local area network environment, each point-to-point link is typically a set of wires communicating data using a serial data protocol. Generally, a serial data protocol defines a protocol for data packets, each packet having a header and a body. As in the case of the parallel implementation, slots travel around the ring on a fixed schedule, this schedule being determined by the serial data protocol. Only one packet can be transmitted during any slot. The applicable protocol defines the means for enforcing slot boundaries among the various devices. As in the case of the on-chip network, links 221 can be either unidirectional or bidirectional.

Slotted Ring Network Operation

In accordance with the preferred embodiment of the present invention, a mechanism for ameliorating starvation in a slotted ring network is provided in which the network carries reservation information with each slot. Any node on the network which detects that it is in a starved state can reserve an unreserved slot, preventing other nodes for transmitting a new packet in the slot. When the slot returns around the ring, it is guaranteed to be available for use by the reserving node.

Certain protocols regarding the operation of the ring and slot reservation are observed in the preferred embodiment, in particular at least three protocols, designated Rules 1 through 3, and an optional protocol designated Rule 4.

In accordance with Rule 1, it is assumed that a packet being transmitted on the ring has priority for re-transmission over data waiting to be transmitted in a node. In other words, through traffic on the ring always has priority, so that once a packet is transmitted from its initiating node, it will reach its destination in a fixed number of cycles equal to the number of links to be traversed.

In accordance with Rule 2, a node which reserves a slot can not immediately re-reserve the same slot once the reservation has returned around the ring and the slot is available for transmission. Allowing a node to re-reserve the same slot would simply allow one node to monopolize the reservations, shifting the starvation problem to the reservations as well.

Rule 3 governs the effect of a reservation, and there are two alternative implementations. In a first alternative implementation of Rule 3, a reservation bars any node other than the reserving node from transmitting a new data packet on the ring. I.e., each node will continue to forward the existing data packet until it reaches its destination, but thereafter no node (other than the reserving node) can initiate transmission of a new data packet on a reserved slot, and the slot will go around the ring empty until it reaches the reserving node. Because a packet never makes a complete circumnavigation of the ring, the slot is guaranteed to be empty by the time the slot makes a complete revolution and returns to the reserving node. This alternative is relatively easy to implement, and requires the transmission of only a single additional bit with each slot to indicate the reservation.

However, it will be observed that the first alternative implementation of Rule 3 may suppress transmission of some data packets unnecessarily. As a second alternative, a reservation bars a node from transmitting a new data packet only if the new data packet will pass the reserving node. I.e., if a new data packet would reach its destination at or before the reserving node, then transmission of the new data packet would not interfere with the original reservation, and such a transmission would not be prevented. In this case, it is still true that the slot is guaranteed to be available when it returns to the reserving node, but it is at least available for limited transmissions to other nodes. The second alternative thus achieves greater utilization of the ring's capacity. However, it is more complex to implement, and requires that an identifier of the reserving node be transmitted along with the reservation. Optimum ring utilization under this second alternative can be obtained if it is possible to transmit packets out of order, so that, if multiple packets are awaiting transmission in the output buffer of a non-reserving node, it can choose a packet which will not interfere with the reservation (even though this may not be the packet at the head of the output buffer's queue). Such capability to transmit packets out of order would further increase the complexity of the supporting logic.

An optional Rule 4 can be used to make transmissions less bursty. Under this optional rule, a node is prevented from reserving successive slots or more than some number of slots of a group of successive slots. Generally this would be implemented to prevent only two successive slots from being reserved, so that a node could reserve every other slot. It could alternatively be implemented to allow reservation only of every Nth slot, where N is some relatively small integer. It could, as a further alternative, be implemented to prevent reserving more than N of M successive slots (e.g., 4 out of every 8). The basic protocol disclosed herein provides fairness in a steady state whether or not optional Rule 4 is used, because even if a node can reserve successive slots, the number of slots it can reserve is limited by Rule 2 to the number of nodes on the ring. If one assumes that the network is heavily loaded, a node will reserve a number of slots equal to the number of nodes on the ring, and will then pass that right in turn to the next node on the ring, and so on. Optional Rule 4 only makes transmission less bursty.

Figure 3A:
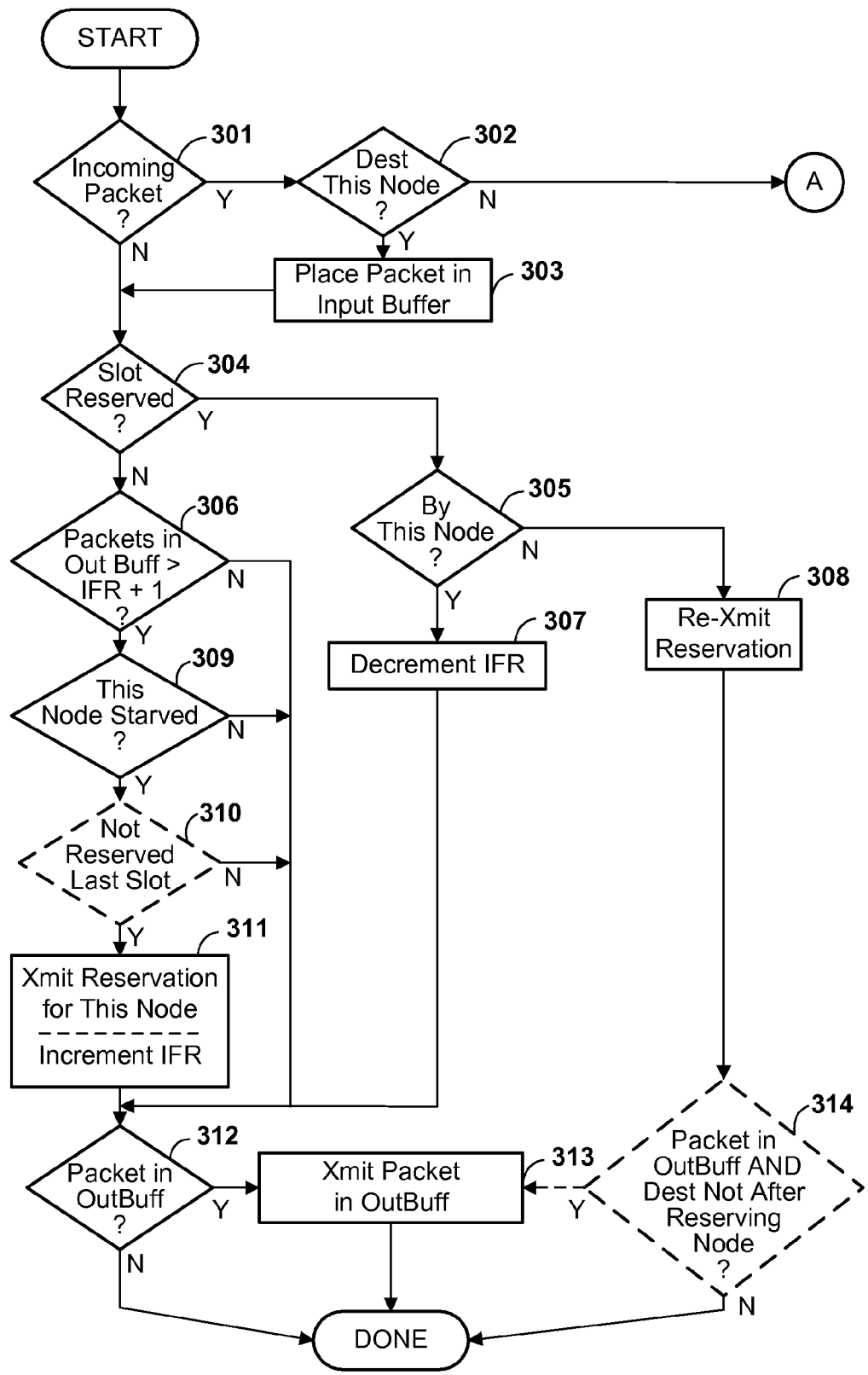
FIGS. 3A and 3B (herein collectively referred to as FIG. 3) are a simplified decision flow diagram showing determinations made by a slotted ring communications interface during processing of a single slot of the slotted ring network, according to the preferred embodiment and certain variations thereof.
Figure 3B:
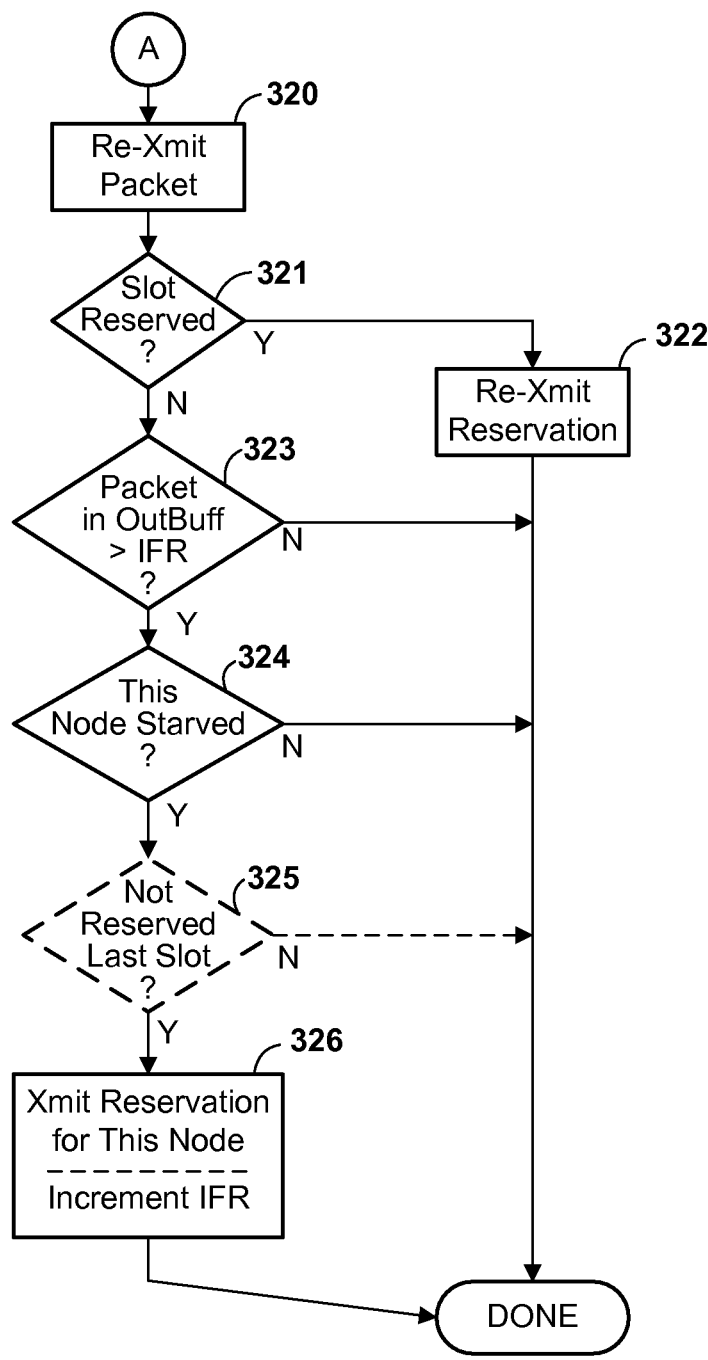

FIGS. 3A and 3B (herein collectively referred to as FIG. 3) are a simplified decision flow diagram showing determinations made by a slotted ring communications interface 112 during processing of a single slot of the slotted ring network, according to the preferred embodiment and certain variations thereof. The decision flow diagram illustrates the implementation of Rules 1 through 3 above, and shows variations of Rule 3 as well as optional Rule 4. By way of orientation, a conventional "greedy" algorithm without reservations, in which each node transmits whenever it has a packet for transmission and an available slot, is represented by steps 301-303, 312, 313 and 320 alone; all the remaining steps illustrated implement a reservation scheme according to the preferred embodiment and certain variations thereof. Each interface 112 takes an independent set of actions on behalf of its corresponding node during each respective cycle (slot) in the operation of the slotted ring network. It will be understood that FIG. 3 is a decision flow diagram intended to represent the decisions implemented by the interface; it does not necessarily represent an actual sequence of steps executed by the interface. In the preferred embodiment, the interface is implemented entirely in hardware, and the decisions depicted in FIG. 3 are made by hardware elements acting concurrently or in parallel. However, it would alternatively be possible to implement an interface using a programmable controller executing a control program, in which case the instructions of the control program could very well execute a sequence of steps as depicted in FIG. 3, or an equivalent sequence of steps.

Referring to FIG. 3, if the applicable slot contains an incoming data packet, the 'Y' branch is taken from step 301. If the destination of the incoming data packet is the present node, i.e. the node of the interface performing these determinations (the 'Y' branch from step 302), then the incoming packet data is placed in the input buffer for the present node (step 303). In this case, it is assumed that the input buffer has available capacity. As is known in the art of slotted ring networks, separate flow control protocols are defined to assure that the input buffer does not overflow, the description of these flow control protocols being unnecessary to an understanding of the present invention. If the destination of the incoming data packet is other than the present node (the 'N' branch from step 302), then the incoming data packet is to be re-transmitted from the present node to the next node on the ring (step 320).

If there was either no incoming packet or the incoming packet was destined for the present node, then the slot is potentially available for transmission of a new packet. The interface determines whether the slot is reserved (step 304), and if reserved, whether the reservation was made by the current node (step 305).

In the event the slot is not already reserved (the 'N' branch from step 304), then the present node may wish to reserve the slot. Two (or optionally three) tests must be satisfied to reserve the slot, as represented by steps 306, 309 and 310: (1) a sufficient number of packets is awaiting transmission in the present node's output buffer; (2) the present node is starved; and optionally (3) the last slot was not reserved. A slot is reserved at step 311 only if all applicable conditions are satisfied; if any condition is not satisfied, step 311 is by-passed.

The first test, represented by step 306, is that the number of packets awaiting transmission in the present node's output buffer must exceed the number of reservations previously made by the present node and not yet returned around the ring ("in-flight reservations" or IFR) by more than one. This test prevents the present node from reserving a slot for a packet which is already guaranteed an open slot. Ideally, the number in the output buffer should exceed IFR by more than one because one packet will be sent in the same cycle (at step 313). It may be acceptable for implementation logic to omit or simplify this test, although it may result in a small inefficiency due to excessive reservations.

The second test, represented by step 309, is that the present node is in a starved state. Any of various algorithms or techniques for determining the presence of a starved state in the present node be used to make the determination represented by step 309. Two exemplary implementations are disclosed herein, it being understood that other implementations could alternatively be used. In a first exemplary implementation, the interface simply counts the number of consecutive blocked cycles. I.e., when a packet is available for transmission in the output buffer, but can not be transmitted either because the slot is occupied by another packet or is reserved for another node, the interface starts a counter, and increments the counter for each cycle that the packet is blocked. If the counter exceeds some threshold value, then the node is considered "starved", and will, if possible, reserve one or more slots. The threshold could be fixed, or could be variable depending on certain environmental considerations. This is a rather simple scheme to implement, and the threshold can be set high enough to avoid excessive reservations. However, this means that a packet may have to wait until the threshold value is exceeded, and then wait an additional number of cycles for the reservation to go around the ring. This could be a relatively long wait to transmit. In a second exemplary implementation, the interface monitors the network before there is a packet available to transmit, and determines whether starvation exists based on recent behavior, such as the proportion of cycles in which there was no incoming packet or in which there was a free slot for transmitting a packet (i.e., no incoming packet and the slot was not reserved by a node which would prevent transmission). This second implementation, though somewhat more complex in implementation, is considered best for most environments because it avoids the potentially long lead time of the first implementation. It would alternatively be possible to dispense with the test represented by step 309 altogether, and allow a reservation whenever the output buffer has unsent packets available for transmission. Although this has the advantage of simplicity and rapidity of response, it may result in too many reservations being placed on the network, which can actually lower network utilization, and for that reason is not considered optimal for most environments.

The third test, represented by optional step 310, is an implementation of the optional Rule 4 described above. If the last slot was reserved by the present node (or if some number N of the last M slots were reserved), then the present node is prevented from reserving the current slot. Where the optional fourth rule is not implemented, then the 'Y' branch is always taken from optional step 310.

If all three applicable tests are met, the present node transmits a reservation for itself on the ring, and increments a count of in-flight reservations (or otherwise adjusts a record of in-flight reservations). The interface may track in-flight reservations by means of a simple counter which is incremented and decremented, or may use a bit shift register, one bit corresponding to each respective slot, or use other appropriate means. As used herein, "increment" or "decrement" the in-flight reservations will be understood to include any of these means.

The decision then proceeds to steps 312 and 313. If there is at least one packet awaiting transmission in the output buffer (the 'Y' branch from step 312), it is transmitted to the next node on the ring (step 313).

If, at step 304, the slot was already reserved, then it is not possible to reserve it, and the 'Y' branch is taken from step 304, by-passing steps 306, 309, 310 and 311. If the reservation was made by the present node (the 'Y' branch from step 305), then it is not possible to re-reserve the slot, but the slot is available for transmission of a new data packet originating from the current node. In this case, the interface decrements the IFR (step 307) to reflect that there is one less in-flight reservation, and the decision proceeds to steps 312 and 313 to transmit a packet from the output buffer, if there is one available.

If, on the other hand, the current slot was already reserved by another node (the 'N' branch from step 305), then the pre-existing reservation is re-transmitted to the next node on the ring (step 308). The pre-existing reservation limits the ability of the current node to transmit from its output buffer, notwithstanding that the slot is free. At this point, there are two possible implementations, depending on the alternative used for implementing Rule 3 above. These are represented by optional step 314. In the first implementation, no further action is taken; this first implementation is equivalent to always taking the 'N' branch from decision step 314. In the second implementation, if there is a packet ready for transmission in the output buffer and the destination of that packet is not after the reserving node, then the 'Y' branch is taken and the packet is transmitted from the output buffer (step 313). If either condition is not met, then the 'N' branch is taken from step 314, and no further action is taken.

In the event that an incoming packet destined for another node was received (represented by the path through steps 301, and 302, to step 320), then Rule 1 requires that the received packet have priority, and must be re-transmitted to the next node on the ring (step 320). Although it is not possible to transmit a packet from the output buffer, it may still be possible to reserve a slot. If the current slot is already reserved (the 'Y' branch from step 321), then it is not possible to reserve the slot for the present node; in this case, the existing reservation is re-transmitted to the next node (step 322) in the same cycle as the data packet transmitted as step 320, and no further action is performed. If the slot is not already reserved (the 'N' branch from step 321), then a series of tests similar to those represented by steps 306, 309 and 310, explained above, must be satisfied to reserve the slot.

If the number of packets waiting in the output buffer does not exceed the IFR, then the 'N' branch is taken from step 323 and no further action is performed. This test, though similar to that performed at step 306, is not identical because no packet will be sent in this cycle. If the test is satisfied, the 'Y' branch is taken from step 323. The tests performed at steps 324 and 325 are identical to those performed at steps 309 and 310, respectively. If all tests are met, the 'Y' branch is taken from step 325, and a reservation is transmitted for the slot on behalf of present node (step 326). At the same time, the number of in-flight reservations is incremented.

Parallel Link Hardware Implementation

Figure 4:
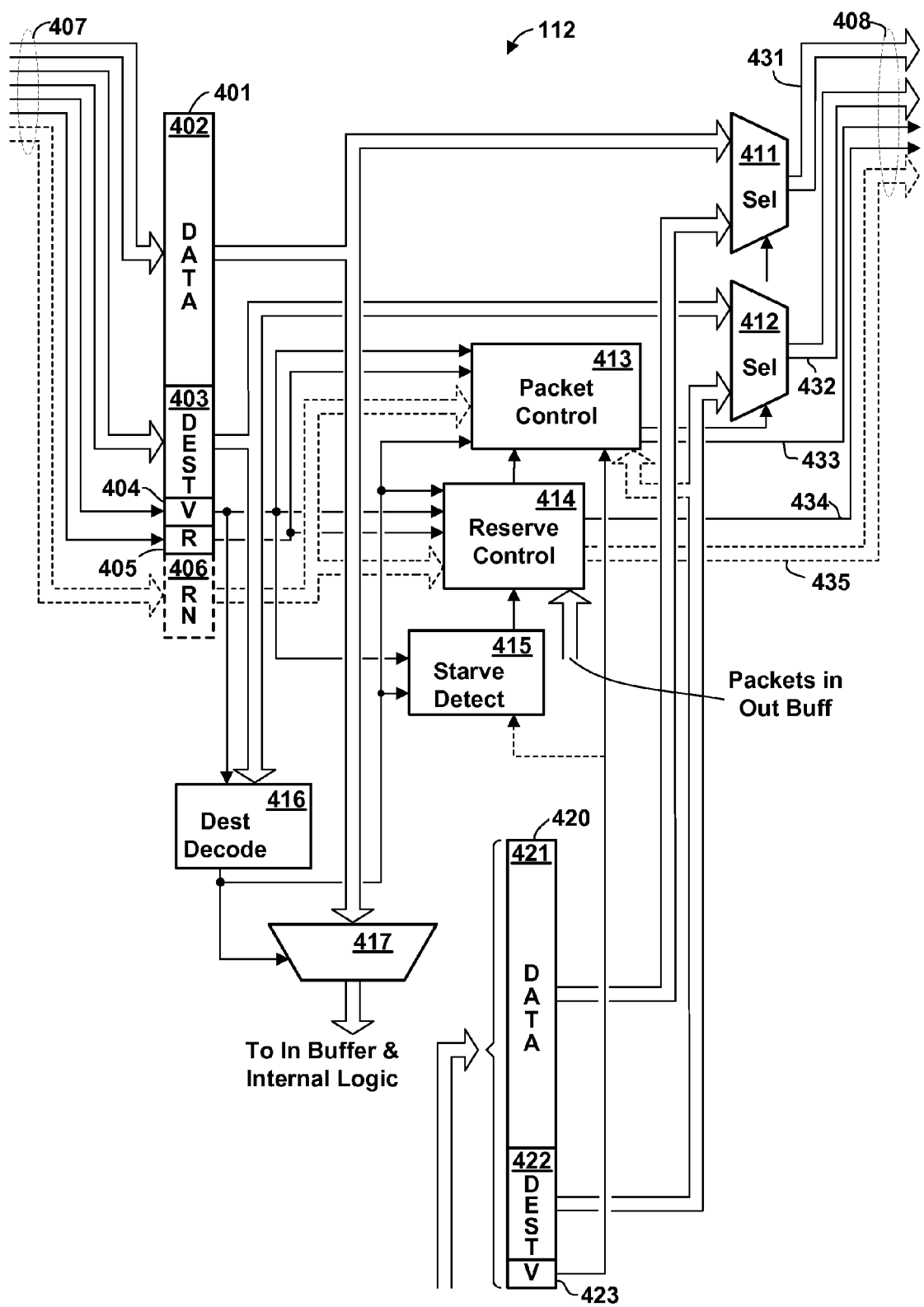
FIG. 4 is a block diagram showing certain major hardware components of an interface for implementing slotted ring communications in a set of parallel point-to-point links, according to the preferred embodiment.

FIG. 4 is a block diagram showing certain major hardware components of an interface 112 for implementing slotted ring communications in a set of parallel point-to-point links 111, according to the preferred embodiment. Referring to FIG. 4, a portion 407 of an input point-to-point communications link 111 is shown entering a receive register 401 of interface 112. Receive register 401 includes a data portion 402 (designated RCV_DATA) for storing data which forms the body of the packet being transmitted, a destination portion 403 (designated RCV_DEST) for storing a node identifier of the destination of the packet, a data valid bit portion 404 (designated RCV_V) for storing a single bit which indicates whether the slot contains a valid data packet, and a reservation portion 405 (designated RCV_R) for storing a single bit indicating that the slot is reserved. Receive register optionally includes a reserving node portion 406 (designated RCV_RN) for storing a node identifier of the node which reserved the slot. Signal lines which make up link portion 407 and register 401 may contain additional control bits or other data, which are omitted for clarity of illustration. In operation, the contents of the parallel signal lines forming the incoming link are clocked into register 401 on each ring cycle, whether or not a packet has actually been sent to the receiving node. The valid bit 404 determines whether the data which was clocked into register 401 constitutes a valid data packet.

Interface 112 drives an output point-to-point communications link for transmission to another node, a portion of which is indicated as feature 408. Output link comprises a set of parallel lines, including a data portion 431 (designated SND_DATA), a destination portion 432 (designated SND_DEST), a data valid bit 433 (designated SND_V), a reservation bit 434 (designated SND_R), and optionally, a reserving node portion 435 (designated SND_RN), which correspond to respective analogous portions of input link 407. Selectors 411,412 select the values of the data 431 (SND_DATA) and destination 432 (SND_DEST) lines of output link 408; packet control logic drives the valid line 433 (SND_V) of output link 408; and reservation control logic 414 drives the reservation line 434 (SND_R) and reserving node lines 435 (SND_RN) of output link 408.

Selective contents of register 401 provide input to selectors 411, 412, packet control logic 413, reservation control logic 414, starvation detection logic 415, destination decode logic 416, and input buffer gate 417. An output buffer 420 contains data waiting for transmission on the ring. Output buffer 420 includes data portion 421 (designated OUTBUFF_DATA) for storing the body of the data packet awaiting transmission, destination portion 422 (designated OUTBUFF_DEST) for storing the node identifier of the destination of the data, and valid bit portion 423 (designated OUTBUFF_V) for indicating whether a valid data packet exists in the buffer.

For simplicity, output buffer 420 is represented as a single register; however, an output buffer will typically contain multiple registers (not shown) arranged as a queue, and register 420 may be regarded as the head of the queue. In the discussion of the logic functions herein, it is assumed for simplicity that a packet to be transmitted always comes from the head of the queue, although in some implementations it may be possible to transmit packets out of order from an output buffer.

In operation, destination decode logic 416 decodes the contents of destination portion 403 and valid bit 404 of receive register 401 to determine whether the destination matches the node in which the interface is located, i.e., is a packet intended for the present node. If so, a corresponding signal, designated Packet_In, is produced to activate input buffer gate 417 to receive the contents of data portion 402 (i.e., the received data packet) into the input buffer of the present node. This signal is also input to starvation detection logic 415, reservation control logic 414, and packet control logic 413.

Starvation detection logic 415 is used to detect that the present node is being starved of ring resources. As explained above, any of various starvation techniques may be used. As one possible implementation, starvation detection logic contains an N-bit saturating counter, i.e. incrementing the counter past its limit causes the counter to retain the maximum value of $2^N-1$, and decrementing the counter below zero likewise causes the counter to retain a value of zero. Starvation detection logic further contains an increment register and a decrement register, which are configurable. For every cycle in which a packet arrives and must be passed through on the ring (or alternatively, in which either a packet arrives or the slot is reserved), the counter is incremented by the amount in the increment register. For every cycle in which no such packet arrives (or alternatively, in which no packet arrives and the slot is unreserved), the counter is decremented by the amount in the decrement register. The increment/decrement condition is determined by evaluating the logic function:

$$\text{RCV\_V AND } (\neg\text{Packet\_In}) \qquad (1)$$

the counter being incremented where function (1) evaluates to "true". A starvation signal (Starved) is the value of the highest order bit of the counter, i.e., if the value of the counter is at least $2^{(N-1)}$, then Starved evaluates to "true".

It will be observed that a starvation logic detection unit as described above will detect starvation whenever the recent history of the ring exhibits a sufficiently high utilization, as determined by the ratio of the increment register to the sum of the increment and decrement registers. The values of the registers can thus be adjusted to obtain a desired ratio. E.g., if it is desirable to detect starvation whenever more than 75% of the slots carry a data packet which must be transmitted through the present node (and thus make it impossible for the present node to transmit any packet), then the increment register should contain a value of 1 and the decrement register a value of 3.

Reservation control logic 414 is used to generate a reservation for the present node or re-transmit a received reservation, and therefore outputs signal SND_R 434 on the output link to the next node. Additionally, reservation control logic 414 optionally outputs a multi-bit reservation node identifier SND_RN 435 identifying the node making the reservation (depending on the implementation of Rule 3 above). SND_R can be generated as the logical OR of logic functions (2) and (3) below:

---

RCV_R AND (Reservation_by_another_node)  (2)
¬ RCV_R AND Starved AND (Out_Buff_Packets > IFR)  (3);

---

In expression (2), the logic value (Reservation_by_another_node) evaluates to "true" where the incoming reservation received (RCV_R) was originally made by a node other than the present node, i.e. it is a reservation which must be forwarded along the ring. This can be determined by the value of RCV_RN, if present, or by a shift register in the reservation control logic which contains one bit for each slot, the bit indicating whether the slot was reserved by the current node, or by other logic means. Expression (3) evaluates to "true" when the present node is placing a new reservation on the ring. In expression (3), the sub-expression (Out_Buff_Packets>IFR) evaluates to true whenever the number of packets waiting in the output buffer (after taking into account a packet which can be transmitted in the current cycle) exceeds the number of in-flight reservations generated by the present node.

If optional Rule 4 is implemented, then expression (3) above would be further modified to suppress transmitting a new reservation where the previous slot was also reserved, i.e., expression (3) would instead become:

---

¬ RCV_R AND Starved AND (Out_Buff_Packets > IFR) AND
    (Previous_Slot_Not_Reserved_By_This_Node)  (4)

---

Where the multi-bit reservation node identifier is used, the output SND_RN is equal to the input RCV_RN if expression (2) above evaluates to "true", and the output SND_RN is set to the node identifier of the present node if expression (3) (or expression (4), if applicable) evaluates to "true". If neither expression (2), nor the applicable one of expression (3) or expression (4), evaluates to true, then no reservation is being sent (SND_R is false). The applicable protocol may specify an appropriate value of SND_RN in this case, or for some protocols any arbitrary value could be output.

Selector 411 selects either the contents of data portion 402 of receive register 401 or data portion 421 of output buffer 420 for transmission on the point-to-point link of the ring to the next node on the ring. Similarly, selector 412 selects either the contents of destination portion 403 of receive register 401 or destination portion 422 of output buffer 420 for transmission. In other words, selectors 411, 412 either re-transmit the received packet or obtain data for transmission from the output buffer. Selection is made according to control signal D_Sel generated by packet control logic 413. Packet control logic also generates a data valid output signal (SND_V) 433 for transmission on the ring, to indicate whether the slot contains a valid data packet.

Packet control logic 413 will generate a D_Sel signal controlling selectors 411, 412 to select the data portion 402 and destination portion 403 of receive register 401 when logic expression (1) above evaluates to "true". It will generate a D_Sel signal to select the data portion 421 and destination portion 422 of output buffer 420 when there is no data packet to be forwarded, there is no reservation to be forwarded, and there is data waiting in the output buffer. I.e., it will generate a D_Sel signal when expression (1) evaluates to "false" and expression (2) evaluates to "false" and OUTBUFF_V is true, expressed as:

(NOT (RCV_V AND (¬ Packet_In))) AND
    (NOT(RCV_R AND (Reservation_by_another_node))) AND
OUTBUFF_V           (5)

The expression (2) component or a signal identifying whether a reservation was made by the present node can be obtained from reservation control logic 414. If the optional implementation of Rule 3 is used, then the expression (2) component of expression (5) above is more complex, because it at least some cases it is possible to transmit a packet notwithstanding that the slot is already reserved. In this case, D_Sel will select the data portion and destination portion of output buffer 420 when the following expression evaluates to "true":

(NOT (RCV_V AND (¬ Packet_In))) AND
    ((NOT(RCV_R AND (Reservation_by_another_node))) OR
    (RCV_R AND (Reservation_by_another_node) AND
    (RCV_RN_does_not_precede_OUTBUFF_DEST)) AND
OUTBUFF_V           (6)

The data valid output signal (SND_V) produced by packet control logic 413 is the logical OR of expression (1) and either expression (5) or expression (6), depending upon which of expression (5) or (6) is being used (which version of Rule 3 is implemented). In the event that neither expression (1), nor the applicable one of expression (5) or (6), is true, then no packet it being sent. In this case, the applicable protocol may specify an appropriate output on the data and destination lines, or in some protocols any arbitrary value might be used.

The logical expressions described above are intended to explain the various conditions implemented in hardware for ease of understanding. It will be appreciated that logic optimization functions may make certain optimizations of the above expressions when generating actual hardware. It will further be understood that FIG. 4 is a simplified representation of certain major components of an interface according to the preferred embodiment, and that certain features not essential to an understanding of the present invention have been omitted for clarity. In particular, the interface may contain additional logic and internal data paths for initial program loads, diagnostics and error recovery, state monitoring, and so forth. Finally, FIG. 4 is intended as but a single example of how logic functions can be implemented in an interface, and alternative arrangements of the logic functions could be used to achieve the same or equivalent results.

Design Structure

Figure 5:
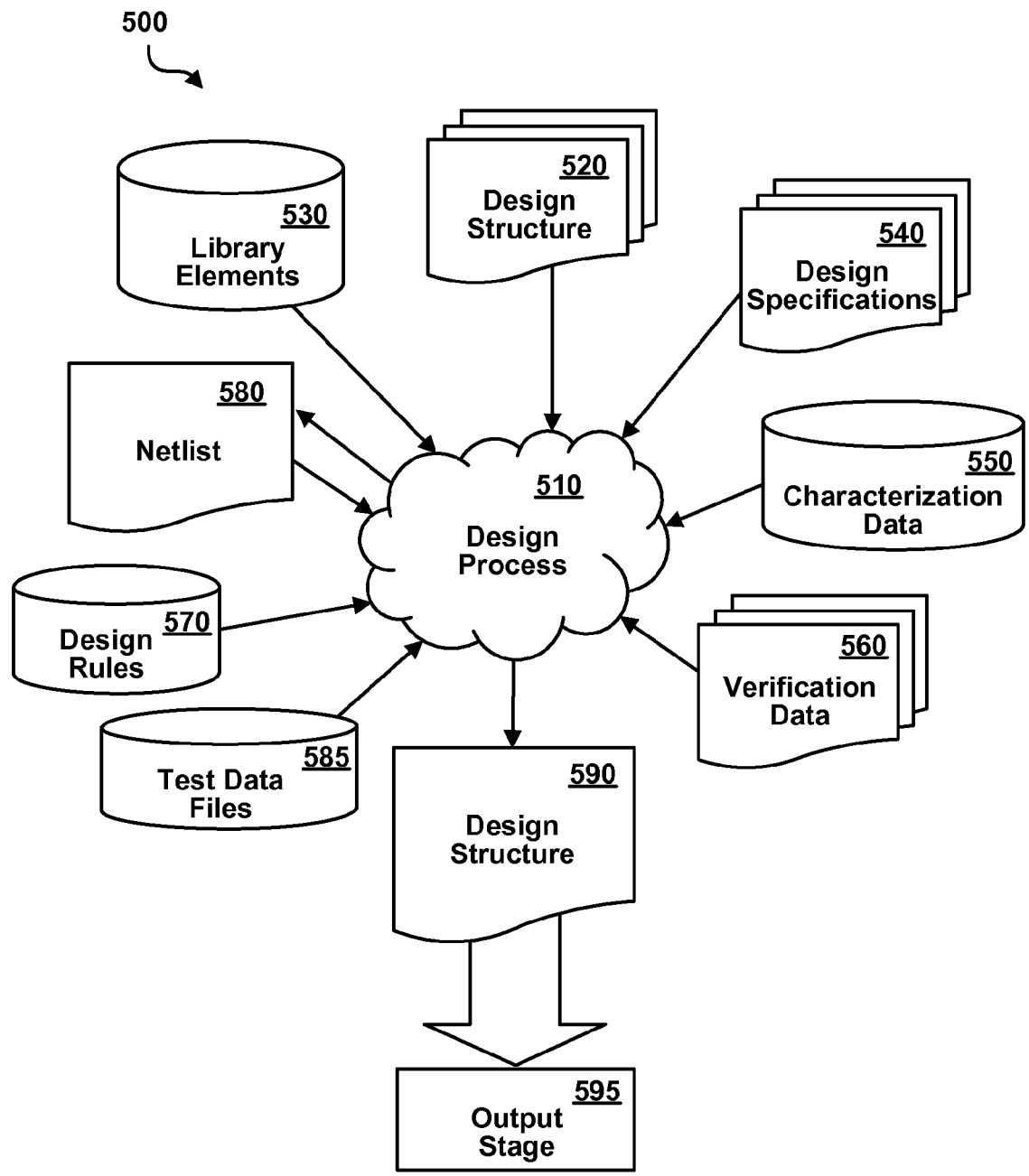
FIG. 5 is a flow diagram of a design process used in semiconductor design, manufacture and/or test.

FIG. 5 shows a block diagram of an exemplary design flow 500 used for example, in semiconductor design, manufacturing, and/or test. Design flow 500 may vary depending on the type of IC being designed. For example, a design flow 500 for building an application specific IC (ASIC) may differ from a design flow 500 for designing a standard component. Design structure 520 is preferably an input to a design process 510 and may come from an IP provider, a core developer, or other design company or may be generated by the operator of the design flow, or from other sources. Design structure 520 comprises an embodiment of the invention as shown in FIG. 1 and/or FIG. 4 in the form of schematics or HDL, a hardware-description language (e.g., Verilog, VHDL, C, etc.). Design structure 520 may be contained on one or more machine readable medium. For example, design structure 520 may be a text file or a graphical representation of an embodiment of the invention as shown in FIG. 1 and/or FIG. 4. Design process 510 preferably synthesizes (or translates) an embodiment of the invention as shown in FIG. 1 and/or FIG. 4 into a netlist 580, where netlist 580 is, for example, a list of wires, transistors, logic gates, control circuits, I/O, models, etc. that describes the connections to other elements and circuits in an integrated circuit design and recorded on at least one of machine readable medium. For example, the medium may be a CD, a compact flash, other flash memory, a packet of data to be sent via the Internet, or other networking suitable means. The synthesis may be an iterative process in which netlist 580 is resynthesized one or more times depending on design specifications and parameters for the circuit.

Design process 510 may include using a variety of inputs; for example, inputs from library elements 530 which may house a set of commonly used elements, circuits, and devices, including models, layouts, and symbolic representations, for a given manufacturing technology (e.g., different technology nodes, 32 nm, 45 nm, 90 nm, etc.), design specifications 540, characterization data 550, verification data 560, design rules 570, and test data files 585 (which may include test patterns and other testing information). Design process 510 may further include, for example, standard circuit design processes such as timing analysis, verification, design rule checking, place and route operations, etc. One of ordinary skill in the art of integrated circuit design can appreciate the extent of possible electronic design automation tools and applications used in design process 510 without deviating from the scope and spirit of the invention. The design structure of the invention is not limited to any specific design flow.

Design process 510 preferably translates an embodiment of the invention as shown in FIG. 1 and/or FIG. 4, along with any additional integrated circuit design or data (if applicable), into a second design structure 590. Design structure 590 resides on a storage medium in a data format used for the exchange of layout data of integrated circuits and/or symbolic data format (e.g. information stored in a GDSII (GDS2), GL1, OASIS, map files, or any other suitable format for storing such design structures). Design structure 590 may comprise information such as, for example, symbolic data, map files, test data files, design content files, manufacturing data, layout parameters, wires, levels of metal, vias, shapes, data for routing through the manufacturing line, and any other data required by a semiconductor manufacturer to produce an embodiment of the invention as shown in FIG. 1 and/or FIG. 4. Design structure 590 may then proceed to a stage 595 where, for example, design structure 590: proceeds to tape-out, is released to manufacturing, is released to a mask house, is sent to another design house, is sent back to the customer, etc.

Alternatives

A particular embodiment and alternatives of the invention have been disclosed herein. Additionally, it has been disclosed that certain aspects of the preferred embodiment might be differently implemented, without necessarily describing in detail each possible alternative implementation. In addition to any variation or alternative above disclosed, the following alternatives or variations are possible within the scope of the present invention.

As mentioned previously, a slotted ring network in accordance with the present invention can be implemented either as a set of parallel or serial communications links. Where serial links are used, it will be understood that equivalent and/or alternative mechanisms appropriate to the use of serial data will be used. For example, the input registers may be constructed as shift registers or using other appropriate means. Since serial data is generally slower, it is often possible to perform the logic functions described above in software. I.e., a serial implementation will generally include a programmable controller which implements the various logic functions implemented by packet control logic 413, reservation control logic 414 and saturation detection logic 415, although a serial implementation could also be implemented in hardware or a combination of hardware and software.

In the preferred embodiment, it is assumed that the number of slots is equal to the number of nodes on the ring, each slot moving one node along the ring in each successive cycle. However, a ring may have more slots than nodes, as for example when one or more nodes buffers slots, or may have fewer slots than nodes, as for example where a slot is several cycles long. A ring could also be bi-directional, containing slots moving in both directions.

Although a hardware embodiment is described herein as a preferred embodiment, it will be understood that the functions described herein could alternatively be implemented in software as one or more computer programs, referred to as a computer program product, whether implemented as part of an operating system or a specific application, program, object, module or sequence of instructions. The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of computer-readable signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network. Examples of signal-bearing media are illustrated in FIG. 1 as semiconductor cache memories 102, 103, 104, and in FIG. 2 as storage array 202.

Although a specific embodiment of the invention has been disclosed along with certain alternatives, it will be recognized by those skilled in the art that additional variations in form and detail may be made within the scope of the following claims:

What is claimed is:

1. A non-transitory machine-readable medium having a design structure recorded thereon, said design structure implementing at least one network interface of a slotted ring communications network, wherein said slotted ring communications network comprises:

a plurality of nodes, each node having a respective network interface a plurality of communications links, each link running between a respective pair of nodes of said plurality of nodes, said plurality of links forming a ring network connecting said plurality of nodes;

wherein said network interfaces concurrently transmit a plurality of slots around said ring network, each slot capable of carrying a respective single data packet and a respective reservation;

wherein each respective said network interface forwards each data packet received by the respective said network interface and destined for another node in the slot in which the data packet was received;

wherein any of said plurality of nodes may reserve a first slot, said first slot being a slot which is previously unreserved, by transmitting a first reservation in the first slot, said first reservation traveling around the ring with the first slot and guaranteeing that, when the first slot returns around the ring to the node which reserved it, the first slot will be free for carrying a data packet originating in the node which reserved the first slot; and wherein said first reservation is non-renewable by the node which reserved the first slot.

2. The non-transitory machine-readable medium having a design structure recorded thereon of claim 1, wherein said reservation transmitted in said first slot inhibits every node other than the node which reserved the first slot from transmitting, in the first slot, any data packet originating in the transmitting node.

3. The non-transitory machine-readable medium having a design structure recorded thereon of claim 1, wherein said reservation transmitted in said first slot inhibits every node other than the node which reserved the first slot from transmitting, in the first slot, any data packet originating in the transmitting node and having a destination which follows the node which reserved the first slot.

4. The non-transitory machine-readable medium having a design structure recorded thereon of claim 1, wherein each said node comprises a respective starvation detection mechanism for detecting that the node is in a starved state, and wherein the node may reserve a slot only if the respective starvation detection mechanism detects that the node is in a starved state.

5. The non-transitory machine-readable medium having a design structure recorded thereon of claim 4, wherein said starvation detection mechanism detects that a number of slots in which the node is blocked from transmitting exceeds a pre-determined threshold.

6. The non-transitory machine-readable medium having a design structure recorded thereon of claim 4, wherein said starvation detection mechanism detects that a proportion of recent slots each carrying at least one of: (a) a respective data packet and (b) a respective reservation, exceeds a pre-determined threshold.

7. The non-transitory machine-readable medium having a design structure recorded thereon of claim 1, wherein said slotted ring network is embodied in a single integrated circuit chip to provide chip internal communications among multiple functional units of the integrated circuit chip, the design structure implementing said single integrated circuit chip.

8. The non-transitory machine-readable medium having a design structure recorded thereon of claim 1, wherein said slotted ring network is embodied as a plurality of links connecting a heterogenous set of digital devices including at least one digital computer system.

9. The non-transitory machine-readable medium having a design structure recorded thereon of claim 1, wherein each said communication link comprises a respective plurality of parallel signal transmission media which transmit a respective single data packet and respective reservation data simultaneously.

10. The non-transitory machine-readable medium having a design structure recorded thereon of claim 1, wherein the design structure comprises a netlist.

11. The non-transitory machine-readable medium having a design structure recorded thereon of claim 1, wherein the design structure resides on storage media as a data format used for the exchange of layout data of integrated circuits.

12. A non-transitory machine-readable medium having a design structure recorded thereon, said design structure for an integrated circuit chip, the integrated circuit comprising:
  a plurality of functional units, each unit having a respective network interface for communicating with other units of said plurality of functional units over a slotted ring network, the slotted ring network comprising a plurality of communications links, each link running between a respective pair of said functional units;
  wherein said network interfaces concurrently transmit a plurality of slots around said slotted ring network, each slot capable of carrying a respective single data packet and a respective reservation;
  wherein each respective said network interface forwards each data packet received by the respective said network interface and destined for another functional unit in the slot in which the data packet was received;
  wherein any of said plurality of network interfaces of said functional units may reserve a first slot, said first slot being a slot which is previously unreserved, by transmitting a first reservation in the first slot, said first reservation traveling around the ring with the first slot and guaranteeing that, when the first slot returns around the ring to the functional unit which reserved it, the first slot will be free for carrying a data packet originating in the functional unit which reserved the first slot; and
  wherein said first reservation is non-renewable by the functional unit which reserved the first slot.

13. The non-transitory machine-readable medium having a design structure recorded thereon of claim 12, wherein said reservation transmitted in said first slot inhibits every functional unit other than the functional unit which reserved the first slot from transmitting, in the first slot, a data packet originating in the transmitting functional unit.

14. The non-transitory machine-readable medium having a design structure recorded thereon of claim 12, wherein said reservation transmitted in said first slot inhibits every functional unit other than the functional unit which reserved the first slot from transmitting, in the first slot, a data packet originating in the transmitting functional unit and having a destination which follows the functional unit which reserved the first slot.

15. The non-transitory machine-readable medium having a design structure recorded thereon of claim 12, wherein each said functional unit comprises a respective starvation detection mechanism for detecting that the functional unit is in a starved state, and wherein the functional unit may reserve a slot only if the respective starvation detection mechanism detects that the functional unit is in a starved state.

16. The non-transitory machine-readable medium having a design structure recorded thereon of claim 12, wherein the design structure comprises a netlist.

17. The non-transitory machine-readable medium having a design structure recorded thereon of claim 12, wherein the design structure resides on storage media as a data format used for the exchange of layout data of integrated circuits.

* * * * *